Figure 1:
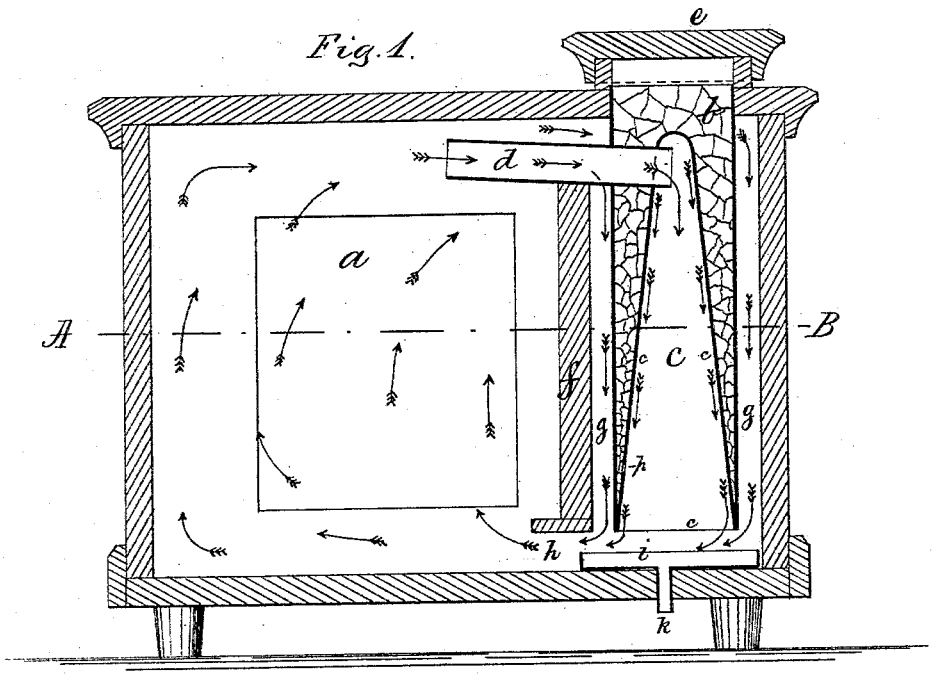

A. J. CHASE.
Refrigerator.

No. 210,995. Patented Dec. 17, 1878.

Witnesses.

Inventor:
Andrew J. Chase.

UNITED STATES PATENT OFFICE.

ANDREW J. CHASE, OF BOSTON, MASSACHUSETTS.

IMPROVEMENT IN REFRIGERATORS.

Specification forming part of Letters Patent No. 210,995, dated December 17, 1878; application filed November 23, 1878.

*To all whom it may concern:*

Be it known that I, ANDREW J. CHASE, of Boston, in the county of Suffolk and State of Massachusetts, have invented certain new and useful Improvements in Preserving Apparatus; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improvement in refrigerating apparatus for the preservation of articles of food. Its object is to automatically bring in contact with the articles to be preserved a current of air, whereby vapors of such articles are continuously removed as fast as exhaled and said articles are kept at a low temperature; to cool, condense, and deprive of moisture the air immediately after it has been in contact with the articles to be preserved and direct it again upon said articles; to economize refrigerating materials and promote purity of the air in a preserving-chamber by causing the air therein to be cooled without direct contact with the refrigerating material.

To these ends my invention consists—

First, in the combination, with a preserving-chamber, of a tank for containing refrigerating material, and having an interior air-chamber, separated by a wall from the surrounding tank, one or more pipes or passages connecting the upper portion of the air-chamber with the upper portion of the preserving-chamber, and one or more suitable passages connecting the lower portion of said air-chamber with the corresponding portion of the preserving-chamber, whereby, when the tank is filled with ice or other refrigerating material, the air within the interior chamber will be cooled and condensed by contact with the walls thereof and flow downward, escaping into the preserving-chamber and coming in contact with articles which may be placed therein for preservation, and when rarefied by contact with said articles it will rise to the upper portion of the preserving-chamber and flow therefrom into the upper portion of the air-chamber within the refrigerating-tank, when it will be again condensed, flow downward, and follow the same path as before, a continuous circulation being thus automatically kept up, a constant supply of cold dry air brought in contact with the articles in the preserving-chamber, and the rarefied air and vapors removed therefrom. When the air charged more or less with moisture, and somewhat raised in temperature, flows from the preserving-chamber into the air-chamber and comes in contact with the walls of the latter, its moist vapors are condensed on said walls and flow downward into a suitable drip-pan arranged below the tank.

Second, in the combination, with a preserving-chamber, of an adjacent chamber, separated therefrom by a non-heat-conducting wall having one or more passages therethrough at top and bottom, a tank for containing refrigerating material, arranged within said adjacent chamber, and separated from the walls thereof by an intervening space, said tank being provided with and surrounding an interior air-chamber, the upper portion of which is connected by a suitable pipe or pipes with the upper portion of the preserving-chamber, and the lower portion of which is connected by a suitable passage or passages with the lower portion of the preserving-chamber and the intervening space between the walls of the tank and the chamber in which it is arranged. By thus inclosing the refrigerating-tank in a chamber separated by a non-conducting wall from the preserving-chamber and separating the tank by an intervening space from the walls of its inclosing-chamber, an air-condensing chamber is formed around as well as within the tank, and the downward tendency of the air in contact with the exterior walls of the tank is prevented from interfering with and retarding the upward flow of the air in the preserving-chamber, as hereinafter more particularly described and explained.

Figure 2:
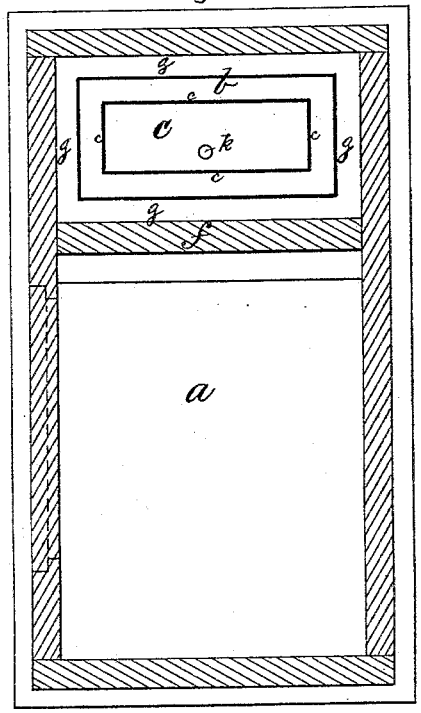

In the accompanying drawings, Figure 1 is a vertical central section of a refrigerating and preserving apparatus constructed according to my invention, and Fig. 2 is a horizontal section taken on line A B of Fig. 1.

The letter *a* indicates the preserving-chamber, which may be constructed with wooden or other non-heat-conducting walls, and $g\ g$ designate a smaller chamber, adjacent to the preserving-chamber, and separated therefrom by an interior wall, $f$, which should also be constructed of wood or other good non-conductor of heat, and has through it at both top and bottom one or more passages connecting the two chambers, which are inclosed in this instance by the same outer walls.

The letter $b$ indicates the tank or receptacle for ice or other refrigerating material, arranged within the chamber $g\ g$. The walls of this tank or receptacle should be formed of metal or other good conductor in order that the frigidity of the inclosed refrigerating material may be communicated to the air in contact with said walls. The upper end of this tank or receptacle passes through an opening in the top wall of the chamber, and is secured thereto by any suitable means, said opening being provided with a lid or cover, $e$.

The letter C indicates an interior chamber, which I call an "air-condensing chamber," formed within and surrounded, except at its lower end, by the tank or receptacle $b$. This interior air-condensing chamber is separated from the space for receiving the refrigerating material by walls $c$, similar to the outer walls of the tank $b$. These walls $c$ at their lower edges are attached to the lower edges of the wall of the tank, which terminates a short distance above the bottom of the chamber $g\ g$, and said walls $c$ extend upward to near the top of the tank or receptacle $b$, and incline inward toward each other, meeting at their tops, so that the air-condensing chamber C is wide at its open bottom and gradually decreases toward its top, which is closed, while the space of the tank for the reception of the refrigerating material, and surrounding the chamber C, is closed and narrow at its bottom, widening toward its top, and, on account of the inclination which is thus given to the walls $c$, it will be seen that the refrigerating material placed in the tank or receptacle will be caused by gravity to lie closely against the inner surface of said walls, so that the full cooling effect of said materials will be communicated through them to the air in chamber C, and also through the outer walls of the tank to the air in chamber $g\ g$, surrounding the tank, and acting also as an air-condensing chamber.

Near the bottom of the walls $c$ may be formed one or more small openings, $p$, for the escape of water from the tank when ice is used for the refrigerating material. This water drops into a drip-pan, $i$, arranged beneath the tank, and provided with a spout, $k$, which leads through the bottom of the chamber.

From the top of the air-condensing chamber C one or more pipes, $d$, lead through the receptacle $b$ and wall $f$ into the upper portion of the preserving-chamber $a$, projecting a short distance therein. The passages through which they pass in the wall $f$ are somewhat larger than the pipes $d$, and permit air to flow from chamber $a$ into chamber $g\ g$, and passages $h\ h$ permit the air, when cooled and condensed, to flow back into chamber $a$ from both chamber $g\ g$ and chamber C.

When the apparatus is in use the flow of air is indicated by the arrows on the drawing. Ice, salt and ice, or any of the ordinary freezing-mixtures may be used in the tank, and, when necessary, the openings $p$ may be closed.

It is obvious that two or more tanks with condensing-chambers and induct-pipes $d$ may be used in connection with a preserving-chamber, and said chamber may have any desired interior or exterior shape, and may, if desired, form the body of a car, or a cabin of a boat or vessel.

By the peculiar construction of the tank and its interior air-condensing chamber it will be seen that I have provided for exposing a large extent of cooling-surface while using a comparatively small quantity of refrigerating material, and that by the arrangement of the tank in a separate chamber divided by a non-conducting wall from the preserving-chamber the down-flowing air in contact with the outer walls of the tank is positively divided from the air of the preserving-chamber, so as not to interfere with the upward current in said chamber.

I wish it to be understood that it is not material what exterior configuration is given to the tank; but the inner wall which separates the condensing-chamber therefrom I prefer to give a uniform inclination inwardly and upwardly from the bottom of the outer tank-wall, so that the cooling effect on all sides of the tank will be practically the same.

Prior to my invention refrigerators have been provided with a tank for receiving a refrigerating material, and through one side of the tank a pipe for conducting air has been passed, said pipe extending down through the said tank in such a manner as to communicate with the interior of the refrigerator; and as such arrangement is old it does not constitute any portion of my invention.

Having thus described my invention, what I claim is—

1. The combination, with a preserving-chamber, of a tank for containing refrigerating material, and having an interior condensing-chamber formed by the inside walls of said tank, one or more pipes connecting and terminating in the upper portion of the condensing-chamber, and one or more passages connecting the lower portion of the condensing-chamber with the lower portion of the preserving-chamber, substantially as and for the purpose set forth.

2. The combination, with a preserving-chamber, of an adjacent chamber separated therefrom by a non-conducting wall having one or more passages at its top and bottom, a tank for containing refrigerating material, arranged within said adjacent chamber, and separated from the walls thereof by an intervening space, said tank having an interior condensing-chamber formed by the inside walls of the tank, the upper portion of said condensing-chamber being connected with the preserving-chamber by means of a pipe, and the lower portion of said condensing-chamber being connected with the preserving-chamber by a suitable passage or passages, the lower passages also being connected with the intervening space, behind the walls of the tank and the chamber in which it is arranged, all substantially as and for the purposes set forth.

In testimony that I claim the foregoing as my own invention I have affixed my signature in presence of two witnesses.

ANDREW J. CHASE.

Witnesses:
ALBAN ANDRÉN,
W. C. TORREY.